(12) United States Patent
Ochadlick, Jr.

(10) Patent No.: US 8,091,544 B1
(45) Date of Patent: Jan. 10, 2012

(54) SOLAR LIGHT COLLECTOR ASSEMBLY HAVING A CLAMP ARRANGEMENT FOR ATTACHING A MIRROR TO A FRAME TRUSS

(75) Inventor: Andrew R. Ochadlick, Jr., New Hope, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 268 days.

(21) Appl. No.: 12/482,100

(22) Filed: Jun. 10, 2009

(51) Int. Cl.
*F24J 2/10* (2006.01)
(52) U.S. Cl. ........................................ 126/696; 126/684
(58) Field of Classification Search ............... 126/696, 126/684; 403/83, 374.3; 248/480, 486, 284.1
See application file for complete search history.

(56) References Cited

U.S. PATENT DOCUMENTS

| | | | |
|---|---|---|---|
| 3,529,859 A | 9/1970 | Garczynski | |
| 4,120,476 A * | 10/1978 | Bourassa et al. | 248/486 |
| 4,153,039 A | 5/1979 | Carroll | |
| 4,263,893 A * | 4/1981 | Pavlak et al. | 126/627 |
| 4,515,148 A * | 5/1985 | Boy-Marcotte et al. | 126/570 |
| 4,583,520 A | 4/1986 | Dietrich et al. | |
| 5,956,917 A | 9/1999 | Reynolds | |
| 6,886,339 B2 | 5/2005 | Carroll et al. | |
| 7,055,519 B2 | 6/2006 | Litwin | |
| 7,240,675 B2 | 7/2007 | Eickhoff | |
| 2006/0053726 A1 | 3/2006 | Reynolds et al. | |
| 2007/0011983 A1 | 1/2007 | Reynolds et al. | |
| 2007/0095340 A1 | 5/2007 | Kuckelkorn et al. | |
| 2008/0072516 A1 | 3/2008 | Reynolds et al. | |
| 2008/0127595 A1 | 6/2008 | Reynolds et al. | |
| 2008/0204352 A1 | 8/2008 | Reynolds et al. | |

\* cited by examiner

*Primary Examiner* — Alfred Basichas
(74) *Attorney, Agent, or Firm* — Howard IP Law Group, PC

(57) ABSTRACT

A solar light collector assembly includes a mirror for concentratedly reflecting solar light; a frame for mounting the mirror; and a clamp arrangement for attaching the mirror to the frame. The clamp arrangement includes at least one base attached to one of the mirror and frame and at least one corresponding clamp attached to the other one of the mirror and frame. The at least one clamp is operative for clamping onto the at least one base to fasten the mirror to the frame.

29 Claims, 6 Drawing Sheets

SOLAR LIGHT COLLECTOR ASSEMBLY HAVING A CLAMP ARRANGEMENT FOR ATTACHING A MIRROR TO A FRAME TRUSS

FIELD

This invention relates to solar light collecting devices. More particularly, this invention relates to a solar light collector assembly having a quick-clamp and release clamp arrangement for attaching a mirror to a frame truss.

BACKGROUND

Parabolic solar troughs for generating electricity from sunlight energy, include light collector assemblies. Many of these light collector assemblies include a truss frame and a trough-shaped mirror assembly mechanically mounted or attached on the truss frame using threaded studs, washers, and nuts.

FIGS. 2A and 2B collectively show one current method for mechanically attaching the mirror assembly to the truss frame. A ceramic pad 10 is adhesively bonded to the back, non-reflecting surface of a mirror 20 of a mirror assembly. A threaded stud 30 is threadedly engaged in a threaded aperture (not shown) of the ceramic pad 10. The other end of the threaded stud 30 extends through an elongated aperture 44 in a truss frame bracket 42 of a truss frame 40 and a washer 50 and a nut 60 threadedly engaged with the stud 30 at a specified torque, are used to prevent separation of the mirror 20 from the truss frame bracket 42.

Standard mirrors used in the light collector assemblies typically have dimensions about 1700 mm×1500 to 1640 mm, and weigh between about 60 and 80 pounds. A solar thermal plant capable of generating 250 MW of electricity may require over 700,000 mirrors and over 2,800,000 studs, washers, and nuts. Each of these mirrors and their corresponding studs, washers, and nuts must be installed and tighten to the specified torque on site. Often times, the location of these solar thermal plants are in the desert. The cumbersome size and weight of the mirrors make holding the mirrors for alignment of the studs into truss frame apertures a difficult and very time consuming process, and requires a relatively large number of installers. In addition, the installation of the over 2.8 million studs in the ceramic pads and the installation of the over 2.8 million washers and nuts on the studs, stresses the installer's fingers, thus making the installation of the mirrors extremely uncomfortable and difficult. Further, the studs are sometimes cross-threaded into the ceramic pads and/or the nuts are cross-threaded onto the studs. This, in turn, often results in over-torqued nuts on the studs and sometimes, broken studs, which must then be replaced.

Accordingly, there is a need for a new method of mechanically mounting or attaching the mirrors to the truss frame.

SUMMARY

Disclosed herein is a solar light collector assembly. The solar light collector assembly comprises a mirror for concentratedly reflecting solar light; a frame for mounting the mirror; and a clamp, arrangement for attaching the mirror to the frame. The clamp arrangement includes at least one base attached to one of the mirror and frame and at least one corresponding clamp attached to the other one of the mirror and frame. The at least one clamp is operative for clamping onto the at least one base to fasten the mirror to the frame.

Also disclosed herein is a clamp arrangement for attaching a mirror of a solar light collector assembly to a frame of the light collector assembly. The clamp arrangement comprises at least one base made of ceramic, for attaching to one of the mirror and frame; and at least one corresponding clamp attached to, integral with, or unitary with the other one of the mirror and frame, the at least one clamp being operative for clamping onto the at least one base to fasten the mirror to the frame.

Further disclosed herein is a solar power apparatus. The solar power apparatus comprises a light receiver for carrying a heat transfer fluid; a mirror for concentratedly reflecting solar light at the light receiver to heat the heat transfer fluid; a frame for mounting the mirror; and a clamp arrangement for attaching the mirror to the frame. The clamp arrangement includes at least one base attached to one of the mirror and frame and at least one corresponding clamp attached to the other one of the mirror and frame. The at least one clamp is operative for clamping onto the at least one base to fasten the mirror to the frame.

BRIEF DESCRIPTION OF THE DRAWINGS

Reference will now be made in detail to the aspects of the present disclosure, examples of which are illustrated in the accompanying drawings, wherein like reference numerals refer to like elements throughout.

DETAILED DESCRIPTION

Figure 1A:
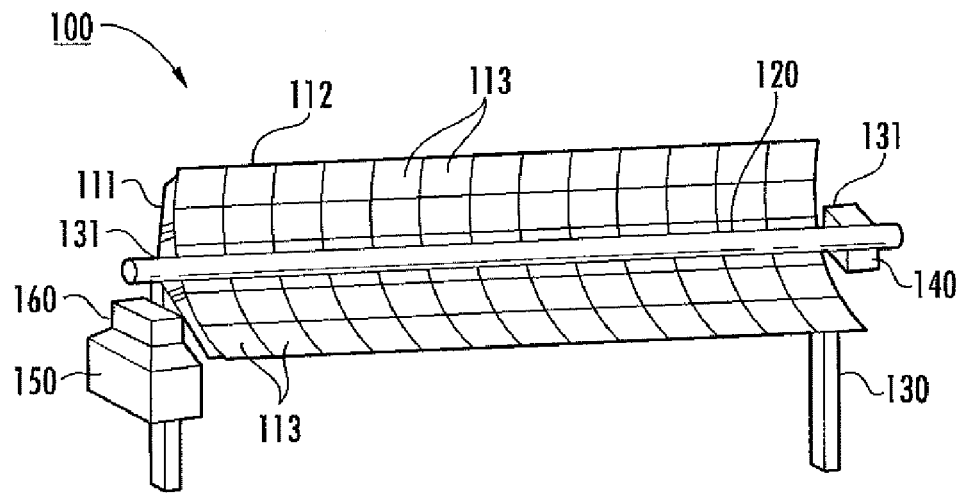
FIG. 1A is a perspective view of an embodiment of a solar trough.
Figure 1B:
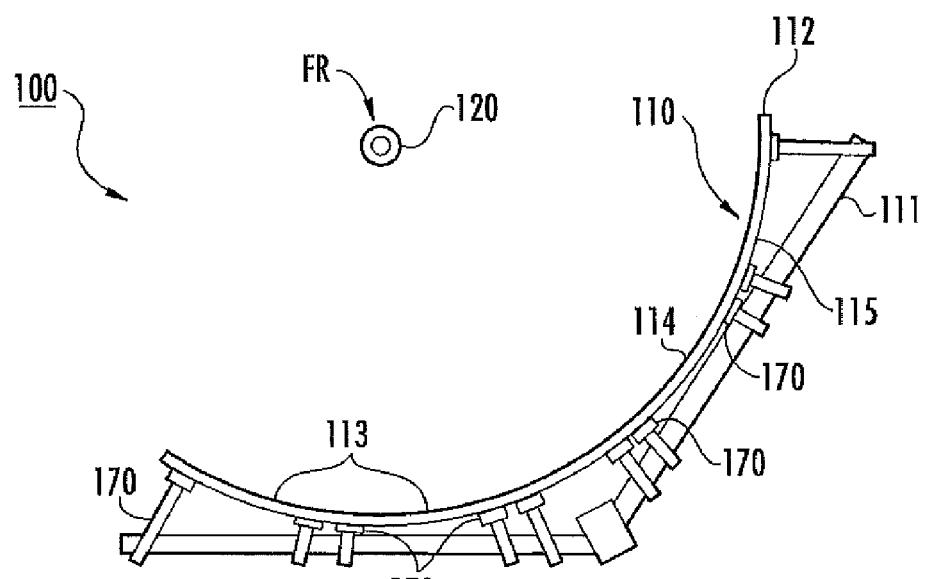
FIG. 1B is a side view of a light collector assembly of the solar trough of FIG. 1A.

FIGS. 1A and 1B collectively illustrate an exemplary embodiment of a solar trough 100. The solar trough 100 generally includes a light collector assembly 110 and a light receiver 120 disposed at a focal point FP of the light collector assembly 110. The light collector assembly 110 includes truss frame 111 and a trough-shaped mirror assembly 112 releasably mounted on or attached to the truss frame 111 by one or more quick-clamp and release clamp arrangements 170. The truss frame 111 supports and maintains the shape of the mirror assembly 112. The mirror assembly 112 is defined by one or more separate mirrors 113. The one or more mirrors 113 each includes a reflective surface 114 and an opposing non-reflective surface 115.

The light collector assembly 110 may be supported by a base frame 130 or other structure, that couples to the truss frame 111 of the light collector assembly 110 via a pivot-like coupling arrangement 13. The base frame 130 is affixed to a ground surface. The pivot-like coupling arrangement 131 is adapted to allow the light collector assembly 110 to be adjustably rotated relative to the base frame 130 so that it may be rotated about the light receiver 120 according to the relative position of the sun so that solar radiation (light) is reflected onto the light receiver 120. A drive mechanism and motor 140 or other actuator may be provided for rotating the light collector assembly 110. The drive mechanism and motor 140 can be controlled by a controller 150, such as a computer, programmable logic device, or the like. The controller 150 may communicate with a sensor 160 or detector that determines the relative position or direction of the sun. In other embodiments, the controller 150 may be pre-programmed with a schedule of the sun's position in the sky so that no sensor or detector is required for determining the sun's position in the sky.

The mirror assembly 112, one exemplary embodiment, has a cross-sectional shape that may be parabolic or substantially parabolic so that light impinging on the reflective surface 114 of the mirror assembly 112 is reflected in a concentrated manner at the receiver 120, which is located at the focal point of the mirror assembly 112. The mirror assembly 112 may also be formed in other shapes for concentratedly reflecting light at the receiver 120. The one or more mirrors 113 of the mirror assembly 112 may be parabolic (in one dimension), flat, spherical (in one dimension), and any other suitable shape or combination of shapes that is/are capable of concentrating light onto the light receiver 120 when assembled to form the mirror assembly 112. In one exemplary embodiment, the mirror 113 comprises a sheet of glass and a reflective metallic layer (e.g. aluminum) disposed on the back surface of the mirror 113. In other exemplary embodiments, the mirror 113 may comprise, without limitation, a sheet of polished aluminum or stainless steel.

The light receiver 120 may be affixed to the base frame 130 and may extend the length of the light collector 110 along the focal point FP of the light collector 110 and carries a heat transfer fluid. The fluid F may be an organic or synthetic oil, water, a solution of water and antifreeze, or molten ionic or nitrate salt. The light receiver 120 may be conventionally constructed as a glass encased absorbent-coated tube. In other embodiments, the receiver 120 may comprise a simple tube without any type of cover or coating. The fluid is circulated through the receiver 120 by a pump (not shown). After being heated by the light collector 110, the fluid may, for example but not limitation, be delivered to a heat exchanger (not shown) where it may be used to heat a hot water storage tank (not shown), create steam for process heating, or heat water in a steam generator (not shown) to turn a steam turbine (not shown), and generate electric power.

Figure 3A:
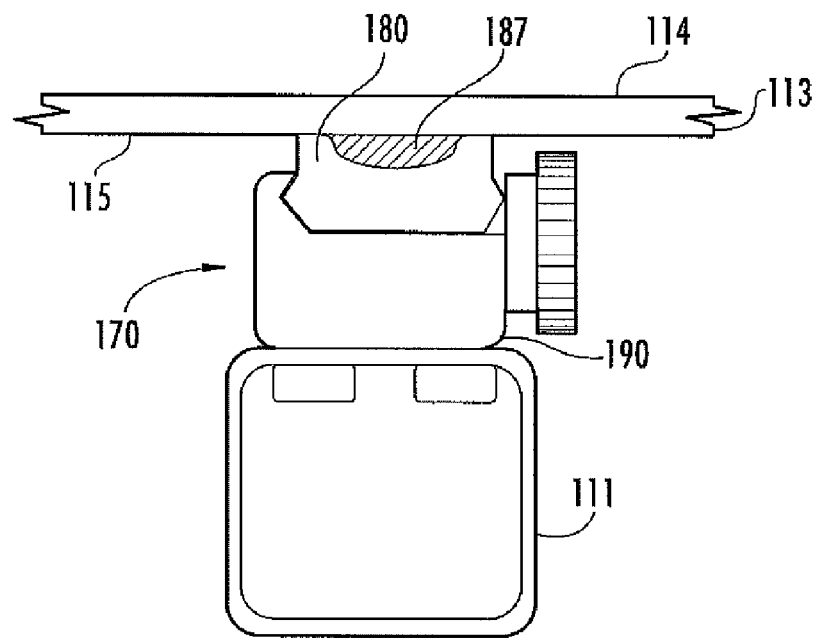
FIG. 3A is an elevational view of an exemplary embodiment of a quick-clamp and release clamp arrangement for attaching a mirror of a light collector assembly to a truss frame of the light collector assembly.

Referring to FIG. 3A, the mirror assembly 112 is releasably coupled to truss frame by the one or more quick-clamp and release clamp arrangements 170. In one non-limiting embodiment, each of the quick-clamp and release clamp arrangements 170 comprises a dovetail-shape base 180 and a releasable clamp 190.

Figure 4:
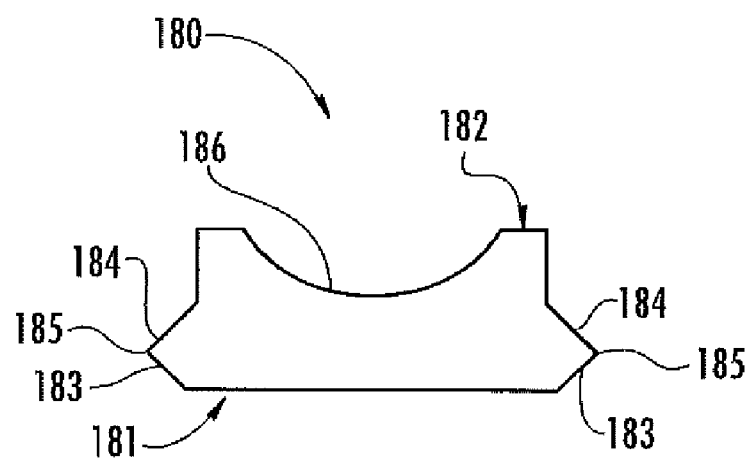
FIG. 4 is an elevational view of a base of the quick-clamp and release clamp arrangement of FIGS. 3A and 3B.

As shown in FIG. 4, the dove-shape base 180 includes a clamp mounting side 181 and an opposing mirror mounting side 182. Extending away from the clamp mounting side 181 of the base 180 are opposing beveled clamp surfaces 183 and opposing, oppositely beveled clamp surfaces 184. Each pair of beveled and oppositely beveled clamp surfaces defines a protruding edge 185.

Figure 2A:
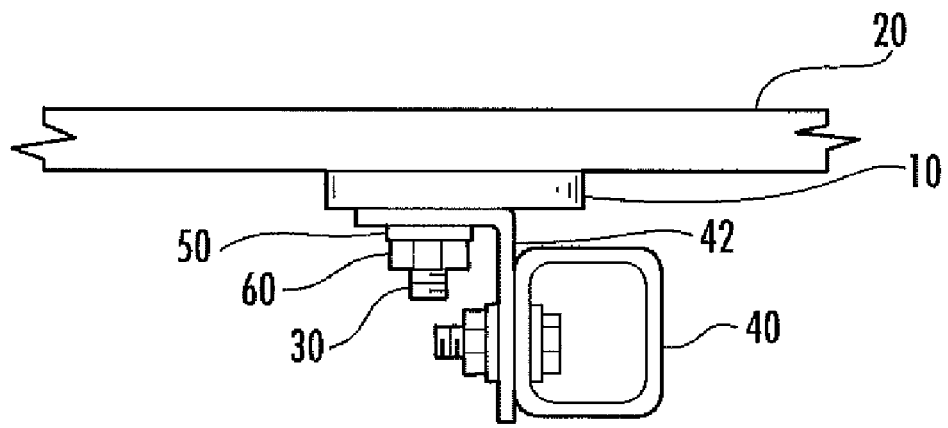
FIG. 2A is an elevational view of a prior art ceramic pad-stud-nut arrangement for attaching a mirror of a light collector assembly to a truss frame of the light collector assembly.
Figure 2B:
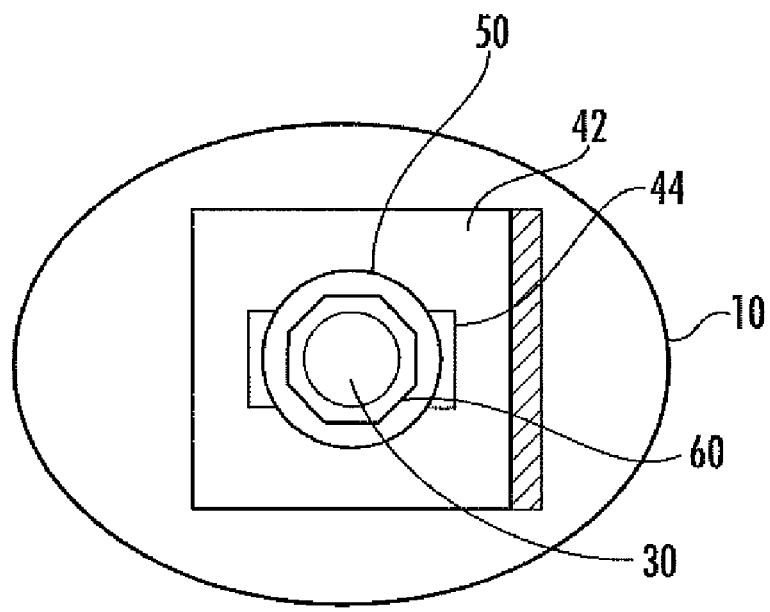
FIG. 2B is a bottom view of the ceramic pad-stud-nut arrangement of FIG. 2B.

In some embodiments, the base 180 is made from a material which has thermal expansion properties which are matched to the thermal expansion properties of the minor, to prevent breakage of the mirror during operation of the solar trough. In such embodiments, the material used for forming the base 180 may be a ceramic. Ceramic materials are well known in the art and are currently used, for example, for forming the ceramic pad 10 shown in prior art FIGS. 2A and 2B.

Figure 3B:
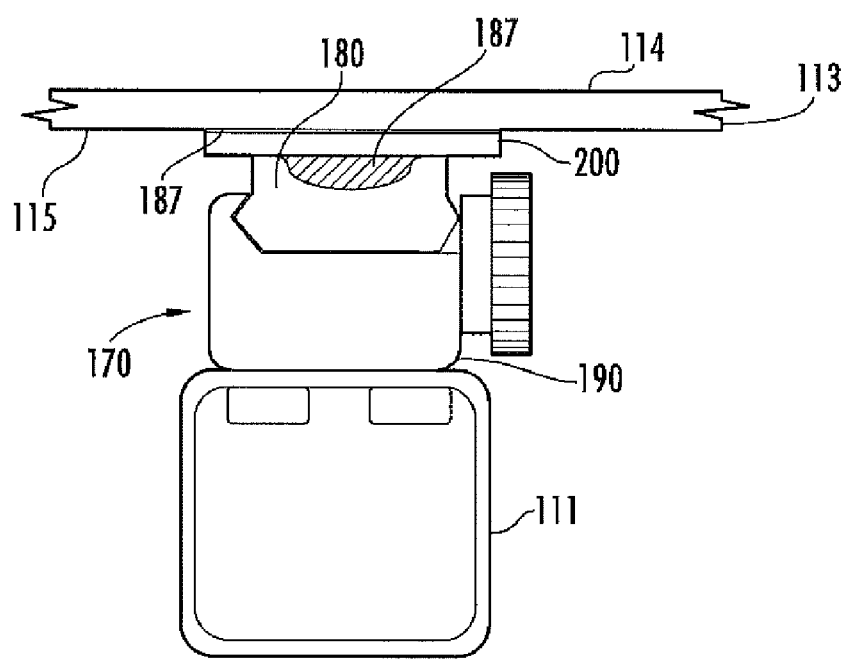
FIG. 3B is an elevational view of another exemplary embodiment of the quick-clamp and release clamp arrangement for attaching a mirror of a light collector assembly to a truss frame of the light collector assembly.

As shown in FIG. 3B, a mounting pad 200 made from a material having thermal expansion properties which are matched to the thermal expansion properties of the mirror, is provided between the base 180 and the non-reflective surface 115 of the mirror 113 for preventing breakage of the mirror 113 during operation of the solar trough. In such embodiments, the material used for forming the mounting pad 200 may be the ceramic discussed immediately above. The mounting pad 200 may be permanently bonded to the non-reflective surface 115 of the mirror 113 with an adhesive, such as a silicon based adhesive.

The mirror mounting side 182 of the base 180 may include a recess or reservoir 186 for placing an adhesive 187 (FIG. 3A), such as a silicon based adhesive on the mirror mounting side 182 of the base 180, which permanently bonds the base 180 to the non-reflective surface 115 of the mirror 113 of the mirror assembly 112 or the corresponding mounting pad attached to the mirror 113 of the mirror assembly 112 (FIG. 3B). The adhesive 187 should also have thermal expansion properties which are matched to the thermal expansion properties of the mirror 113.

Figure 5:
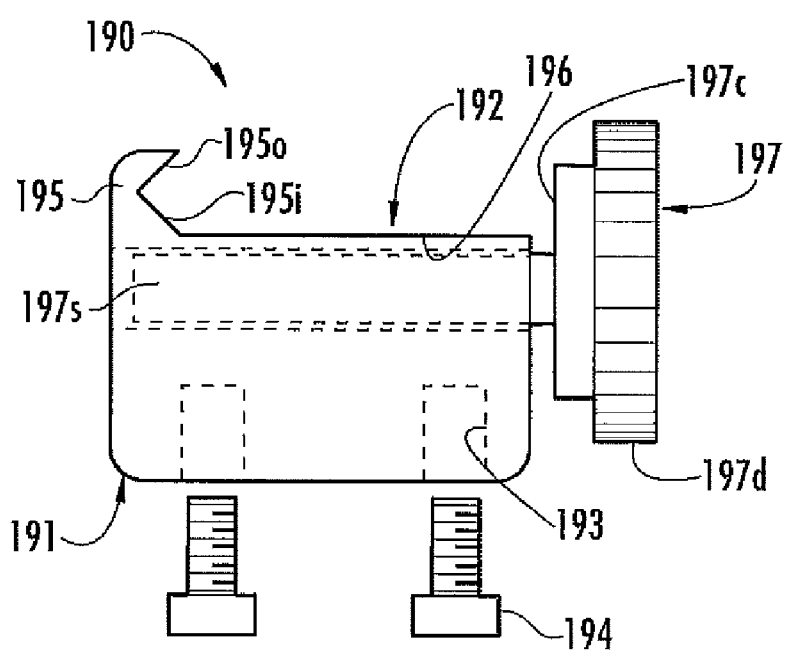
FIG. 5 is an elevational view of a clamp of the quick-clamp and release clamp arrangement of FIGS. 3A and 3B.

As shown in FIG. 5, the releasable clamp 190 includes a truss frame mounting side 191 and an opposing base mounting side 192. The truss frame mounting side 191 of the clamp 190 includes one or more threaded apertures 193 for receiving corresponding screw fasteners 194, which fasten the releasable clamp 190 to the truss frame 111 (FIG. 3). The base mounting side 192 of the clamp includes a fixed, clamp member or arm 195 defining a first outwardly extending inclined clamp surface 195*o* and a second inwardly extending inclined clamp surface 195*i*. In some embodiments, the clamp 190 may form an integral element of the truss frame. In still other embodiments, the clamp 190 may be unitary formed with the truss frame.

As shown in FIGS. 3A and 3B, the first outwardly extending inclined clamp surface 195*o* is complementary to, and in operation, releasably biased against one of the two oppositely beveled clamp surfaces 184 of the base 180. The second inwardly extending inclined clamp surface 195*i* is complementary to, and in operation, releasably biased against one of the two beveled clamp surfaces 183 of the base 180.

Referring again to FIG. 5, a threaded aperture 196 is provided in the side of the clamp 190 opposite the fixed, clamp arm 195, for receiving a movable clamp member 197. The movable clamp member 197 may comprise a thumb-screw including a threaded stud 197*s* with a drive member or knob 197*d* attached at one end of the stud in a permanent manner. The end of the threaded stud 197*s* opposite the drive member or knob 197*d* threads into the threaded aperture 196 in the side of the clamp 190. The clamp side of the drive member or knob includes a clamp surface 197*c* that, in operation, is releasably biased against one of the two protruding edges 185 of the base 180 (FIGS. 3A and 3B).

The base 180 and clamp 190 of the quick-clamp and release clamp arrangement 170 may be assembled to the one or mirrors 113 of the mirror assembly 112 and truss frame 111, respectively at, the manufacturing facility. Therefore, all the problems associated with the on-site mounting process of the mirrors 113 on truss frame 111 using conventional studs, washers, and nuts, are eliminated.

Figure 6A:
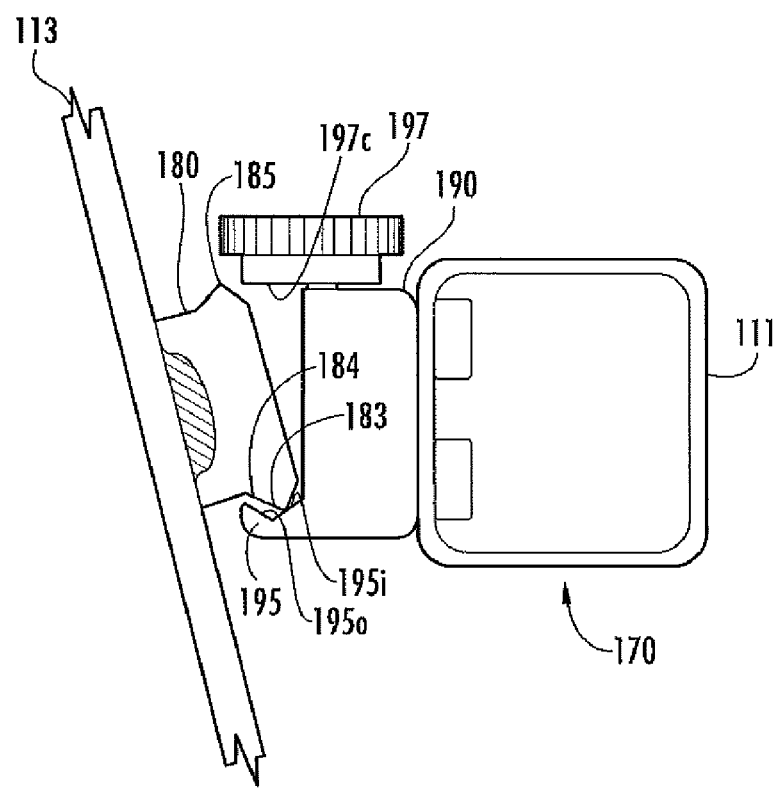
FIGS. 6A and 6B are elevational views illustration a process for assembling a mirror of a light collector assembly to a truss frame of the light collector assembly using the clamp of the quick-clamp and release clamp arrangement of FIGS. 3A and 3B.
Figure 6B:
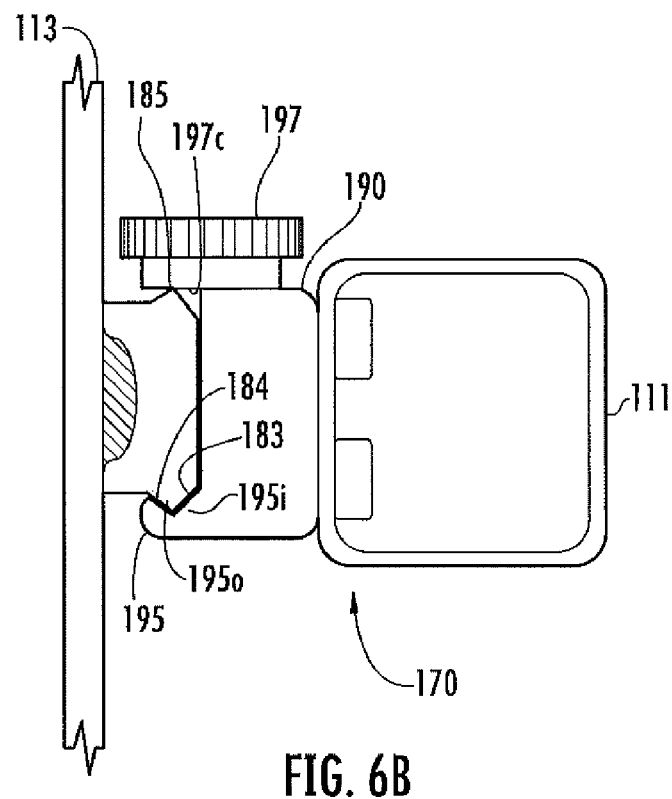

FIGS. 6A and 6B collectively illustrate one exemplary process for mounting the one or more mirrors 113 of the mirror assembly 112 to the truss frame 111 using the clamp arrangement 170 disclosed herein. For the sake of simplicity only, FIGS. 6A and 6B illustrate only a single clamp arrangement 170 for attaching the mirror 113 to, the truss frame 111. It should be understood, however, that the mirror 113 may be attached to the truss frame 111 with multiple clamp arrangements 170. In a first step of this process, as shown in FIG. 6A, the mirror 113 is tilted relative to, and moved toward the truss frame 111 to engage the base 180 with the clamp 190. The direction of tilting is selected to engage a first pair of the clamp surfaces 183 and 184 of the base 180 with respective clamp surfaces 195i and 195o of the fixed clamp arm 195 of the clamp 190. Accordingly, the weight of the mirror 113 may now be transferred to the truss frame 111 through the first pair of the base clamp surfaces 183 and 184 engaging and resting on the respective clamp surfaces 195i and 195o of the clamp 190.

In a second step of the method, as shown in FIG. 6B, the fixed clamp arm 195 operates as a pivot point for the base 180 as the mirror 113 is rotated to move the other pair of the beveled and oppositely beveled clamp surfaces 183, 184 of the base 180 toward the moveable clamp member 197 (e.g., a thumb-screw) of the clamp 190. The moveable clamp member 190 is then actuated (tightened in the case of the thumb-screw) to bring its clamp surface 197c into biased engagement with the protruding edge 185 of the second pair of base clamp surfaces 184, 184.

Figure 7:
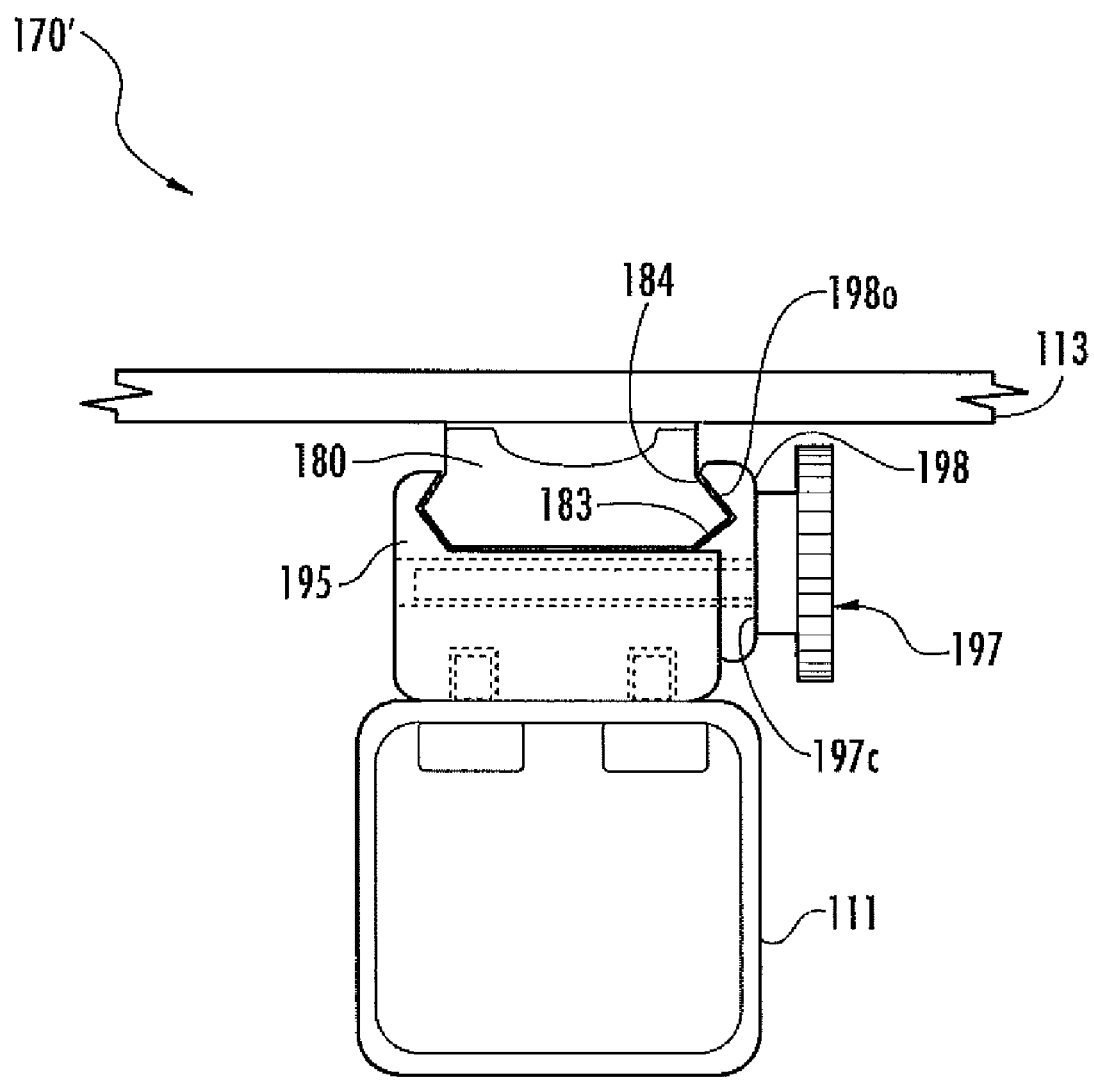
FIG. 7 is an elevational view of yet another exemplary embodiment of a quick-clamp and release clamp arrangement for attaching a mirror of a light collector assembly to a truss frame of the light collector assembly.

FIG. 7 shows another non-limiting embodiment of the quick-clamp and release clamp arrangement 170'. The quick-clamp and release clamp arrangement 170' is similar to the clamp arrangement 170 of FIGS. 3A and 3B, except that the moveable clamp member 190 of the clamp 190 further includes a moveable clamp arm 198 configured with clamp surfaces 198o and 198i similar to clamp surfaces 195o and 195i of the fixed clamp arm 195. An aperture 198a disposed adjacent to the clamp surfaces 198o, 198i, allows the threaded stud 197s of the thumb-screw 197 to extend through the moveable clamp arm 198 and into the body of the clamp 190. In operation, the clamp surface 197c of the thumb-screw driver or knob 197d is releasably biased against an outer surface 198 of the moveable clamp arm 198. This, in turn, releasably biases the clamp surfaces 198o and 198i of the moveable clamp arm 198 against respective clamp surfaces 184 and 183 of the base 180 during operation.

It should be understood that in other embodiments of the quick-clamp and release clamp arrangement, the dove-tail shaped engaging portions of the base and clamp may define other tongue and groove shape structures. In addition, the fixed clamp arm of the clamp and the corresponding clamp surfaces of the base may be replaced by a detachable hinge arrangement. Further, the quick-clamp and release arrangement is not limited to solar troughs and may be used in other solar concentrator applications including but not limited to solar dishes.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A solar light collector assembly comprising:
a mirror for concentratedly reflecting solar light;
a frame for mounting the mirror; and
a clamp arrangement for attaching the mirror to the frame, the clamp arrangement including at least one base attached to one of the mirror and frame, and at least one corresponding clamp attached to, integral with, or unitary with the other one of the mirror and frame, the at least one clamp being operative for clamping onto the at least one base to fasten the mirror to the frame.

2. The solar light collector assembly of claim 1, wherein the at least one base includes at least two clamp surfaces.

3. The solar light collector assembly of claim 1, wherein at least one of the at least two clamp surfaces is beveled.

4. The solar light collector assembly of claim 1, wherein the at least one of the at least two clamp surfaces is oppositely beveled.

5. The solar light collector assembly of claim 1, wherein the at least one base includes two beveled clamp surfaces and two opposing beveled clamp surfaces.

6. The solar light collector assembly of claim 5, wherein at least one of the beveled clamp surfaces and at least one of the opposing beveled clamp surfaces define a protruding edge.

7. The solar light collector assembly of claim 5, wherein the clamp comprises complementary clamping surfaces to the two beveled clamp surfaces and the two opposing beveled clamp surfaces of the base.

8. The solar light collector assembly of claim 6, wherein the clamp comprises a clamp surface complementary to the protruding edge of the clamp surfaces of the base to secure the clamp relative to the base.

9. The solar light collector assembly of claim 1, wherein the at least one clamp includes a fixed clamp arm and a moveable clamp member.

10. The solar light collector assembly of claim 9, wherein the fixed clamp arm includes an inwardly inclined clamp surface.

11. The solar light collector assembly of claim 9, wherein the moveable clamp member includes a clamp surface.

12. The solar light collector assembly of claim 11, wherein the clamp surface is inwardly inclined.

13. The solar light collector assembly of claim 12, wherein moveable clamp member further includes a thumb-screw.

14. The solar light collector assembly of claim 11, wherein moveable clamp member further includes a thumb-screw.

15. The solar light collector assembly of claim 14, wherein the thumb-screw defines the clamp surface.

16. The solar light collector assembly of claim 1, wherein the mirror is trough-shaped.

17. The solar light collector assembly of claim 16, wherein the mirror has a generally parabolic cross-sectional shape.

18. The solar light collector assembly of claim 1, wherein the mirror is formed by a plurality of mirror segments.

19. The solar light collector assembly of claim 1, wherein the frame is a truss frame.

20. The solar light collector assembly of claim 1, wherein the at least one clamp includes a fixed clamp portion for receiving a first portion of the at least one base, the fixed clamp portion of the at least one clamp and first portion of the at least one base cooperating to transfer the weight of the mirror to the frame during installation of the mirror to the frame.

21. The solar light collector assembly of claim 20, wherein the at least one clamp includes a moveable clamp member for biasly engaging a second portion of the at least one base.

22. The solar light collector assembly of claim 1, wherein the at least one base is made from a ceramic.

23. The solar light collector assembly of claim 1, further comprising a ceramic mounting pad disposed between the at least one base and the mirror.

24. The solar light collector assembly of claim 1, wherein the mirror comprises a first reflective side and a second side opposite the first reflective side, wherein the base is attached directly to the mirror on the second side.

25. The solar light collector assembly of claim 1, wherein the base is attached to the mirror, and the clamp is attached to the frame.

26. The solar light collector assembly of claim 1, wherein the clamp comprises a first side clamping to the base, and a second side, opposite the first side, attaching to one of the frame or the mirror, and wherein the base comprises a first side engaging with the clamp, and a second side, opposite the first side, attaching to the other one of the frame or the mirror.

27. The solar light collector according to claim 1, further comprising:

an adjustable member operative to apply pressure to at least one of the clamp and the base to secure the clamp relative to the base, wherein:

the mirror comprises a first reflective side and a second side opposite the first reflective side, the base is fixed to the second side of the mirror on a first side thereof, the base comprising a second side, opposite the first side, having at least one engaging surface thereon, and the clamp is fixed to the frame on a first side thereof, the clamp comprising a second side, opposite the first side, having at least one engaging surface thereon, said engaging surface complementary to the engaging surface on the second side of the base for securing the second side of the base to the second side of the clamp.

28. A clamp arrangement for attaching a mirror of a solar light collector assembly to a frame of the light collector assembly, the clamp arrangement comprising:

at least one base made of ceramic, for attaching to one of the mirror and frame; and at least one corresponding clamp attached to, integral with, or unitary with the other one of the mirror and frame, the at least one clamp being operative for clamping onto the at least one base to fasten the mirror to the frame.

29. A solar power apparatus comprising:

a light receiver for carrying a heat transfer fluid;

a mirror for concentratedly reflecting solar light at the light receiver to heat the heat transfer fluid;

a frame for mounting the mirror; and a clamp arrangement for attaching the mirror to the frame, the clamp arrangement including; at least one base attached to one of the mirror and frame and at least one corresponding clamp attached to the other one of the mirror and frame, the at least one clamp being operative for clamping onto the at least one base to fasten the mirror to the frame.

* * * * *